(12) United States Patent
Shveidel et al.

(10) Patent No.: US 11,994,989 B2
(45) Date of Patent: May 28, 2024

(54) CACHE EFFICIENCY ANALYSIS BASED ON IN-DEPTH METRICS INSTRUMENTATION

(71) Applicant: Dell Products L.P., Round Rock, TX (US)

(72) Inventors: Vladimir Shveidel, Pardes-Hana (IL); Lior Kamran, Richon LeZion (IL); Leron Fliess, Kiryat Ono (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/889,680

(22) Filed: Aug. 17, 2022

(65) Prior Publication Data
US 2024/0061777 A1    Feb. 22, 2024

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 8,549,224 B1 | 10/2013 | Zeryck et al. | |
| 10,101,917 B1 | 10/2018 | Agans | |
| 10,761,990 B2 | 9/2020 | Xu et al. | |
| 11,086,793 B2 | 8/2021 | Kucherov et al. | |
| 11,093,410 B2 | 8/2021 | Gao et al. | |
| 11,204,870 B2 | 12/2021 | Kucherov et al. | |
| 11,379,375 B1 | 7/2022 | Gottin | |
| 2014/0108828 A1* | 4/2014 | Breternitz | G06F 1/329 713/300 |
| 2023/0140121 A1* | 5/2023 | Ramos | G06F 13/1673 710/200 |

* cited by examiner

*Primary Examiner* — Brian R Peugh
(74) *Attorney, Agent, or Firm* — BainwoodHuang (57) ABSTRACT

Techniques for analyzing cache efficiencies in storage systems based on in-depth metrics instrumentation. The techniques include collecting metrics instrumentation data for each page of a specific type stored in a cache memory component of a storage system. The metrics instrumentation data for each page of a specific type includes a timestamp indicating when the page was stored in the cache, a timestamp indicating when the last cache hit occurred for the page, a current number of cache hits for the page, and an indication of the specific type of page. The techniques further include, based on the metrics instrumentation data, obtaining a plurality of metrics for each specific type of page stored in the cache. The techniques further include, based on the plurality of metrics and/or the metrics instrumentation data, performing a remedial action to improve performance of the cache memory component or provide more optimal use of memory resources.

20 Claims, 7 Drawing Sheets

CACHE EFFICIENCY ANALYSIS BASED ON IN-DEPTH METRICS INSTRUMENTATION

BACKGROUND

Storage systems include storage processing circuitries and arrays of storage devices such as solid-state drives (SSDs), hard disk drives (HDDs), optical drives, and so on. The storage processing circuitries service storage input/output (IO) requests issued by host computers communicably coupled to the storage systems. The storage IO requests (e.g., read requests, write requests) specify pages, files, blocks, or other storage elements to be read from or written to volumes (VOLs), logical units (LUNs), filesystems, or other storage objects maintained on the storage devices. For faster data access, the storage systems implement one or more cache memory components (or caches) configured to store storage elements (e.g., data pages, metadata pages) for servicing read requests issued by the host computers. If a data or metadata page specified by a read request is hit in a cache, then it is read quickly and directly from the cache and returned to an application of the host computer that issued the read request. Otherwise, if the data or metadata page is missed in the cache, then it is read from one or more storage devices instead of the cache, increasing a length of time required for accessing the data or metadata page. Storage systems can employ one or more metrics for analyzing the performance of caches implemented by the storage systems. Such metrics can include a "hit ratio" metric (or hit ratio), which can be calculated by dividing a number of cache hits for a page by a total number of cache hits and cache misses for the page.

SUMMARY

Unfortunately, analyzing cache performance using the "hit ratio" metric can fail to detect certain cache inefficiencies. For example, in one possible scenario, all host-issued read requests over a period of time may be directed to just a limited number of storage elements (e.g., pages) stored in a cache, resulting in a hit ratio of "1" (or a hit ratio percentage of 100%). However, the limited number of requested pages may be from among a multitude of pages stored in the cache, which may be maintaining an inefficiently large and undetected amount of memory space for pages with hit ratios of "0" (or hit ratio percentages of 0%). In another possible scenario, a cache may be storing pages for several different types of pages such as VLB (virtual large block) metadata pages, hierarchical (top/mid/leaf) mapper metadata pages, space accounting metadata pages, page bin metadata pages, and so on. Further, a specific type of metadata page (e.g., VLB) stored in the cache may not only have a hit ratio of "0" but also be occupying an inefficiently large and undetected amount of memory space in the cache. In each of these scenarios, cache inefficiency might be addressed by resizing the cache and/or evicting a specific type of page from the cache. However, because cache inefficiencies in these and other possible scenarios can go undetected, such remedial actions are often not undertaken.

Techniques are disclosed herein for analyzing cache efficiencies in storage systems based on in-depth metrics instrumentation. In the disclosed techniques, metrics instrumentation data can be collected, during runtime, for each storage element (e.g., page) of a specific type stored in a cache memory component of a storage system. Based on the metrics instrumentation data, a plurality of metrics can be obtained and used to determine efficiency (or inefficiency) of the cache. The metrics instrumentation data for each page of a specific type can include (i) a timestamp indicating when the page was stored in the cache, (ii) a timestamp indicating when the most recent (or last) cache hit occurred for the page, (iii) a current number of cache hits for the page, and/or (iv) an indication of the specific type of page. The plurality of metrics for a specific type of page can include (i) a total number of cache hits for each page of the specific type during the page's lifetime in the cache, (ii) the time interval between cache hits for each page of the specific type, (iii) a lifetime of each page of the specific type in the cache, (iv) a current number of pages of the specific type in the cache, (v) a total number of cache hits and cache misses for each page of the specific type, (vi) a current number of cache hits for each page of the specific type, (vii) a time period during which cache hits occurred for each page of the specific type divided by the page's lifetime in the cache, and/or (viii) a current number of pages of the specific type evicted from the cache. Based on the cache efficiency (or inefficiency), as determined by the plurality of metrics and/or the metrics instrumentation data, a remedial action can be taken, such as reducing a size of the cache, increasing the size of the cache, or evicting a specific type of page from the cache, thereby improving performance of the cache or providing more optimal use of memory resources of the storage system.

In certain embodiments, a method of analyzing cache efficiencies in a storage system includes collecting metrics instrumentation data for each page from among a plurality of pages of a specific type of pages stored in a cache of a storage system, obtaining a plurality of metrics for the specific type of pages stored in the cache based on the metrics instrumentation data, and based on the plurality of metrics and/or the metrics instrumentation data, performing a remedial action to improve performance of the cache or provide more optimal use of memory resources of the storage system.

In certain arrangements, the metrics instrumentation data for each page of the specific type includes two or more of (i) a timestamp indicating when the page of the specific type was stored in the cache, (ii) a timestamp indicating when a last cache hit occurred for the page of the specific type, (iii) a current number of cache hits for the page of the specific type, and (iv) an indication of the specific type of pages.

In certain arrangements, the plurality of metrics for the specific type of pages include two or more of (i) a total number of cache hits for each page of the specific type during a lifetime of the page in the cache, (ii) a time interval between cache hits for each page of the specific type, (iii) a lifetime of each page of the specific type in the cache, (iv) a current number of pages of the specific type stored in the cache, (v) a total number of cache hits and cache misses for each page of the specific type, (vi) a current number of cache hits for each page of the specific type, (vii) a time period during which cache hits occurred for each page of the specific type divided by the lifetime of the page in the cache, and (viii) a current number of pages of the specific type evicted from the cache.

In certain arrangements, each page from among the plurality of pages is a metadata page, and the specific type of pages is one of a VLB (virtual large block) type of metadata page, a hierarchical (top/mid/leaf) mapper type of metadata page, a space accounting type of metadata page, and a page bin type of metadata page.

In certain arrangements, the method further includes reducing a size of the cache, increasing the size of the cache, or evicting the specific type of pages from the cache.

In certain arrangements, the plurality of metrics include (i) a total number of cache hits for each page of the specific type during a lifetime of the page in the cache, and (ii) a current number of pages of the specific type stored in the cache, and the method further includes generating a histogram depicting data indicative of the total number of cache hits for each page of the specific type during the lifetime of the page in the cache, and tracking, by a counter, the current number of pages of the specific type stored in the cache.

In certain arrangements, the method further includes analyzing the histogram to determine that the total number of cache hits is approximately zero for each page of the specific type during the lifetime of the page in the cache, detecting an inefficiency of the cache due to the current number of pages of the specific type stored in the cache being greater than zero and the total number of cache hits being approximately zero for each page of the specific type during the lifetime of the page in the cache, and evicting the specific type of pages from the cache.

In certain arrangements, the metrics instrumentation data includes a timestamp indicating when a last cache hit occurred for a particular page of the specific type, the plurality of metrics include a lifetime of each page of the specific type in the cache, and the method further includes generating a histogram depicting data indicative of the lifetime of each page of the specific type in the cache.

In certain arrangements, the method further includes analyzing the histogram to determine the lifetime of each page of the specific type in the cache, detecting an inefficiency of the cache due to lifetimes of most pages of the specific type in the cache being significantly greater, above a predefined threshold, than a length of time since the last cache hit occurred for the particular page of the specific type, and reducing a size of the cache.

In certain arrangements, the metrics instrumentation data includes a timestamp indicating when a last cache hit occurred for a particular page of the specific type and a current number of cache hits for the particular page of the specific type, the plurality of metrics include a lifetime of each page of the specific type in the cache, and the method further includes generating a histogram depicting data indicative of the lifetime of each page of the specific type in the cache, and tracking, by a counter, the current number of cache hits for the particular page of the specific type.

In certain arrangements, the method further includes determining an interval of time since the last cache hit occurred for the particular page of the specific type relative to a time indicated by the timestamp, and obtaining a product of the interval of time and the current number of cache hits for the particular page of the specific type.

In certain arrangements, the method further includes analyzing the histogram to determine the lifetime of each page of the specific type in the cache, detecting an inefficiency of the cache due to the product of the interval of time since the last cache hit occurred for the particular page of the specific type and the current number of cache hits for the particular page of the specific type being approximately equal to a lifetime of the particular page in the cache, and increasing a size of the cache.

In certain embodiments, a system for analyzing cache efficiencies in a storage system includes a memory and processing circuitry configured to execute program instructions out of the memory to collect metrics instrumentation data for each page from among a plurality of pages of a specific type of pages stored in a cache of a storage system, to obtain a plurality of metrics for the specific type of pages stored in the cache based on the metrics instrumentation data, and based on the plurality of metrics and/or the metrics instrumentation data, to perform a remedial action to improve performance of the cache or provide more optimal use of memory resources of the storage system.

In certain arrangements, the metrics instrumentation data for each page of the specific type includes two or more of (i) a timestamp indicating when the page of the specific type was stored in the cache, (ii) a timestamp indicating when a last cache hit occurred for the page of the specific type, (iii) a current number of cache hits for the page of the specific type, and (iv) an indication of the specific type of pages.

In certain arrangements, the plurality of metrics for the specific type of pages include two or more of (i) a total number of cache hits for each page of the specific type during a lifetime of the page in the cache, (ii) a time interval between cache hits for each page of the specific type, (iii) a lifetime of each page of the specific type in the cache, (iv) a current number of pages of the specific type stored in the cache, (v) a total number of cache hits and cache misses for each page of the specific type, (vi) a current number of cache hits for each page of the specific type, (vii) a time period during which cache hits occurred for each page of the specific type divided by the lifetime of the page in the cache, and (viii) a current number of pages of the specific type evicted from the cache.

In certain arrangements, the processing circuitry is further configured to execute the program instructions out of the memory to perform the remedial action of reducing a size of the cache, increasing the size of the cache, or evicting the specific type of pages from the cache.

In certain arrangements, each page from among the plurality of pages is a metadata page, and the specific type of pages is one of a VLB (virtual large block) type of metadata page, a hierarchical (top/mid/leaf) mapper type of metadata page, a space accounting type of metadata page, and a page bin type of metadata page.

In certain embodiments, a computer program product includes a set of non-transitory, computer-readable media having instructions that, when executed by processing circuitry, cause the processing circuitry to perform a method including collecting metrics instrumentation data for each page from among a plurality of pages of a specific type of pages stored in a cache of a storage system, obtaining a plurality of metrics for the specific type of pages stored in the cache based on the metrics instrumentation data, and based on the plurality of metrics and/or the metrics instrumentation data, performing a remedial action to improve performance of the cache or provide more optimal use of memory resources of the storage system.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of exemplary cache efficiency analysis code and data executed by the storage system of FIG. 1a;

FIG. 3a is an exemplary histogram depicting data indicative of the "hits per retention time" metric of FIG. 2a, and FIG. 3b is a block diagram of the metrics generator of FIG. 1d including an exemplary "number of pages stored in cache" counter for counting a current number of pages of a specific type stored in a cache, for use in describing a first illustrative example of analyzing cache efficiencies based on in-depth metrics instrumentation;

DETAILED DESCRIPTION

Techniques are disclosed herein for analyzing cache efficiencies in storage systems based on in-depth metrics instrumentation. The disclosed techniques can include collecting metrics instrumentation data for each storage element (e.g., page) of a specific type stored in a cache of a storage system. The metrics instrumentation data for each page of a specific type can include a timestamp indicating when the page was stored in the cache, a timestamp indicating when the last cache hit occurred for the page, a current number of cache hits for the page, and/or an indication of the specific type of page. The disclosed techniques can further include, based on the metrics instrumentation data, obtaining a plurality of metrics for each specific type of page stored in the cache. The disclosed techniques can further include, based on the plurality of metrics and/or the metrics instrumentation data, reducing a size of the cache, increasing the size of the cache, or evicting a specific type of page from the cache, thereby improving performance of the cache or providing more optimal use of memory resources of the storage system.

Figure 1A:
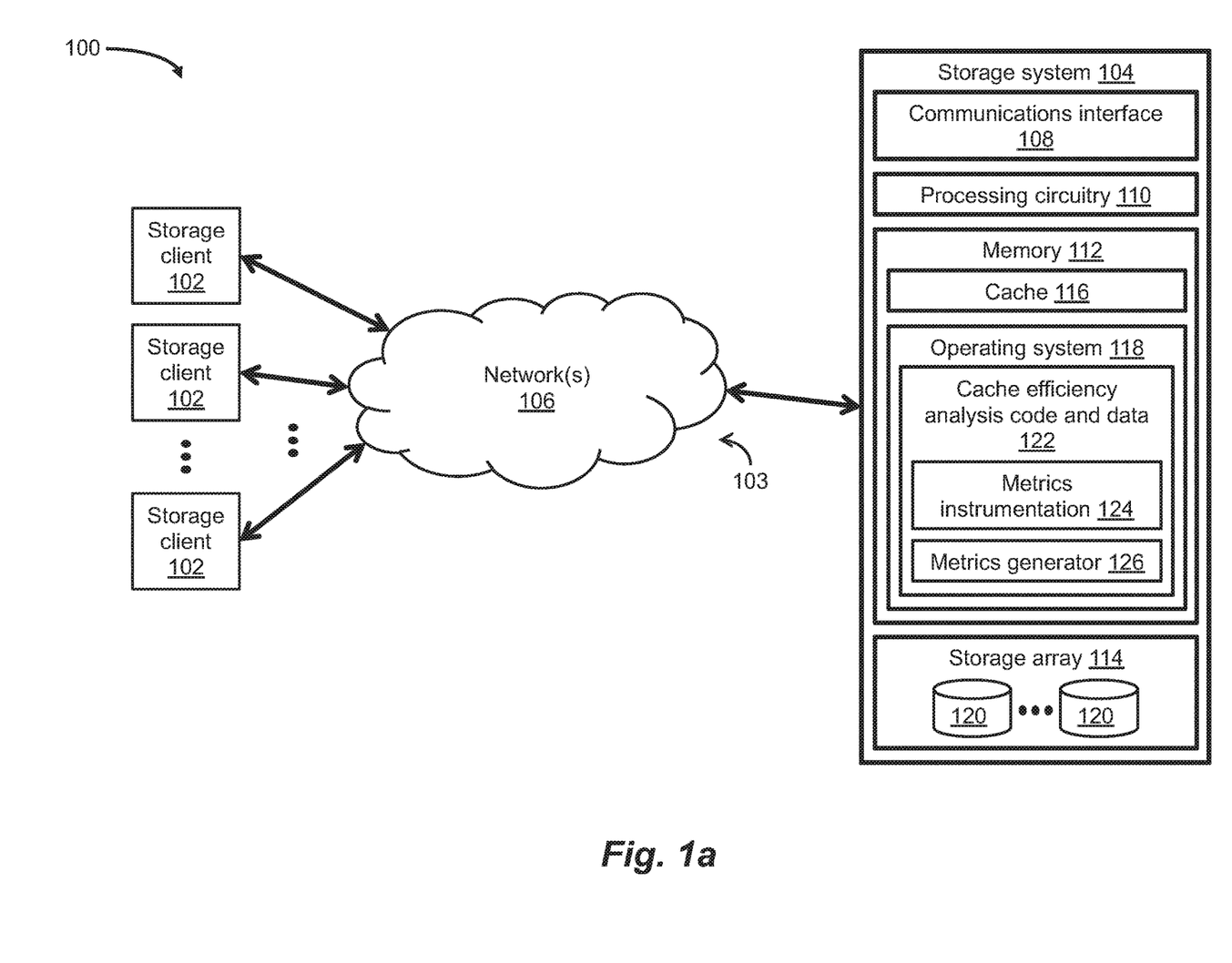
FIG. 1a is a block diagram of an exemplary storage environment, in which techniques can be practiced for analyzing cache efficiencies in a storage system based on in-depth metrics instrumentation.

FIG. 1a depicts an illustrative embodiment of an exemplary storage environment 100, in which techniques can be practiced for analyzing cache efficiencies in storage systems based on in-depth metrics instrumentation. As shown in FIG. 1a, the storage environment 100 can include one or more storage client computers (or storage client(s)) 102 communicably coupled to a storage system 104 by a communications medium 103 that includes at least one network 106. For example, each of the storage clients 102 may be configured as an email server computer, a file server computer, a web server computer, and/or any other suitable client computer, server computer, or computerized device. The storage clients 102 can be further configured to provide, over the network(s) 106, storage input/output (IO) requests (e.g., small computer system interface (SCSI) commands, network file system (NFS) commands) to the storage system 104. In response to the storage IO requests (e.g., read requests, write requests), one or more storage processors of the storage system 104 can perform operations such as IO operations (e.g., read operations, write operations), which cause data or metadata pages, files, blocks, or any other suitable storage elements specified in the storage IO requests to be read from or written to volumes, logical units, filesystems, or any other suitable storage objects maintained on one or more storage devices 120. The storage system 104 can be configured as a standalone storage system including a single storage appliance, a clustered storage system including two or more storage appliances, one of multiple cloud-based storage systems in a cloud infrastructure, or any other suitable storage appliance or system.

The communications medium 103 can be configured to interconnect the storage clients 102 with the storage system 104 to enable them to communicate and exchange data and control signaling. As shown in FIG. 1a, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1a, the storage system 104 can include a communications interface 108, one or more storage processors (or, more generally, processing circuitry) 110, at least one memory 112, and a storage array 114. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110.

The processing circuitry 110 can be configured to process storage IO requests (e.g., read requests, write requests) issued by one or more of the storage clients 102 and store client data in a redundant array of independent disk (RAID) environment implemented on the storage array 114. The storage array 114 can include the storage devices 120 such as solid-state drives (SSDs), hard disk drives (HDDs), optical drives, flash drives, hybrid drives, and/or any other suitable storage drive(s) or device(s). The storage devices 120 can be configured to store volumes, logical units, filesystems, and/or any other suitable storage objects for hosting data and/or metadata storage of client applications (e.g., email client applications, file client applications, web client applications) running on the storage clients 102.

The memory 112 can include persistent memory (e.g., flash memory, magnetic memory) and non-persistent memory (e.g., dynamic random-access memory (DRAM), static random-access memory (SRAM)). The memory 112 can further include at least one cache memory component (or cache) 116, an operating system (OS) 118 such as a Linux OS, Unix OS, Windows OS, or any other suitable operating system, as well as a variety of software constructs realized in the form of specialized code and data such as cache efficiency analysis code and data 122. The cache 116 can be configured to store data and/or metadata pages for servicing read requests issued by the storage clients 102. If a data or metadata page specified by a read request is hit in the cache 116, then the page can be read quickly and directly from the cache 116 and returned to an application of the storage client 102 that issued the read request. Otherwise, if the data or metadata page is missed in the cache 116, then the page can be read from one or more of the storage devices 120 instead of the cache 116, increasing a length of time required for accessing the data or metadata page. In some embodiments, entries in the cache 116 can be updated or invalidated in accordance with a cache replacement policy such as a least recently used (LRU) policy, a most recently used (MRU) policy, or any other suitable policy. The cache efficiency analysis code and data 122 can include metrics instrumentation 124 for storage elements (e.g., pages) stored in the cache 116, as well as a metrics generator 126 for the pages stored in the cache 116.

Figure 1B:
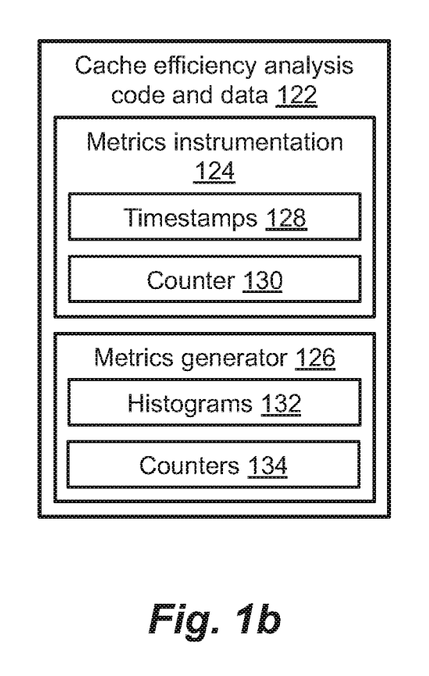
Figure 1C:
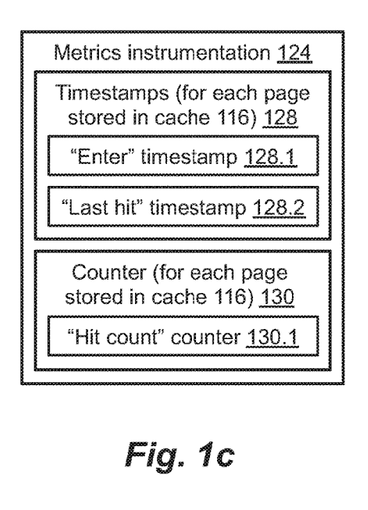
FIG. 1c is a block diagram of exemplary metrics instrumentation maintained by the cache efficiency analysis code and data of FIG. 1b.

FIG. 1b depicts a more detailed view of the cache efficiency analysis code and data 122 of FIG. 1a, including the metrics instrumentation 124 and the metrics generator 126. The processing circuitry 110 (see FIG. 1a) can be configured to execute the cache efficiency analysis code and data 122 to collect data from the metrics instrumentation 124 for each storage element (e.g., page) of a specific type stored in the cache 116. For example, a page may be a metadata page, and the specific type of metadata page may be a "VLB" (virtual large block) type of metadata page, a "hierarchical (top/mid/leaf) mapper" type of metadata page, a "space accounting" type of metadata page, a "page bin" type of metadata page, or any other suitable type of metadata page. Further, a page may be a data page having the specific type of "data." In some embodiments, data from the metrics instrumentation 124 for each page of a specific type can be collected as one or more timestamps 128, such as an "enter" timestamp 128.1 (see FIG. 1c) indicating when the page was stored in the cache 116, and a "last hit" timestamp 128.2 (see FIG. 1c) indicating when the most recent (or last) cache hit occurred for the page. Further, in some embodiments, the data from the metrics instrumentation 124 for each page of a specific type can be collected using at least one counter 130, such as a "hit count" counter 130.1 (see FIG. 1c) for counting a current number of cache hits for the page. The data from the metrics instrumentation 124 can also include an indication of the specific type of page or any other suitable data. It is noted that such data from the metrics instrumentation 124 can be maintained as metadata for each data page and meta-metadata for each metadata page.

Figure 1D:
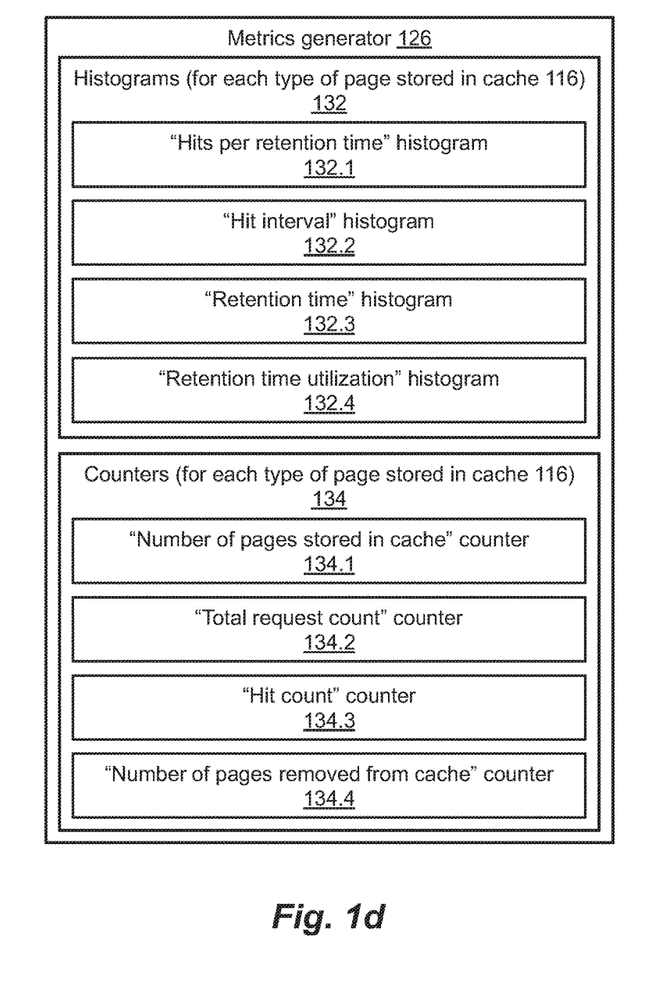
FIG. 1d is a block diagram of an exemplary metrics generator implemented by the cache efficiency analysis code and data of FIG. 1b.

The metrics generator 126 can be configured to generate a plurality of metrics for each specific type of page stored in the cache 116 based on data from the metrics instrumentation 124 for pages of the specific type. In some embodiments, data can be arranged in one or more histograms 132 for some of the plurality of metrics, such as a histogram 132.1 (see FIG. 1d) for a "hits per retention time" metric that indicates a total number of cache hits for each page of a specific type during the page's lifetime in the cache 116, a histogram 132.2 (see FIG. 1d) for a "hit interval" metric that indicates the time interval between cache hits for each page of the specific type, a histogram 132.3 (see FIG. 1d) for a "retention time" metric that indicates a lifetime of each page of the specific type in the cache 116, and a histogram 132.4 (see FIG. 1d) for a "retention time utilization" metric that indicates a time period during which cache hits occurred for each page of the specific type divided by the page's lifetime in the cache 116.

Figure 2A:
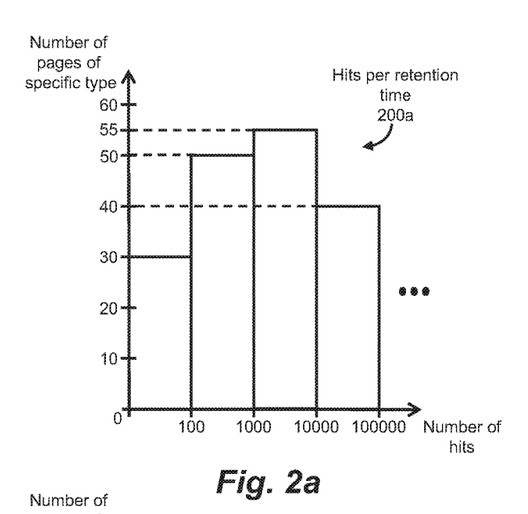
FIGS. 2a-2d are exemplary histograms generated by the metrics generator of FIG. 1d, in which the histograms depict data indicative of four (4) metrics for a cache of the storage system of FIG. 1a, namely, a "hits per retention time" metric (see FIG. 2a), a "hit interval" metric (see FIG. 2b), a "retention time" metric (see FIG. 2c), and a "retention time utilization" metric (see FIG. 2d)
Figure 2B:
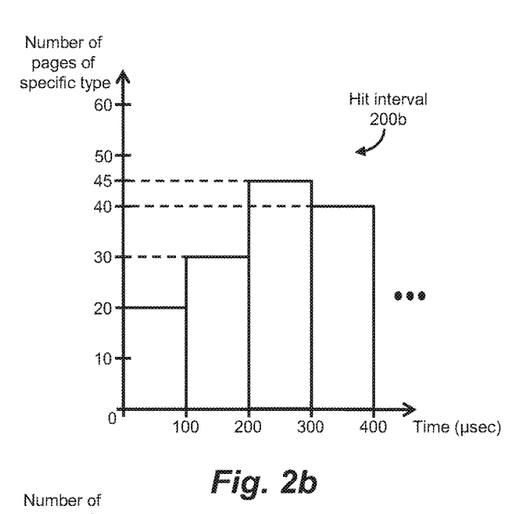
Figure 2C:
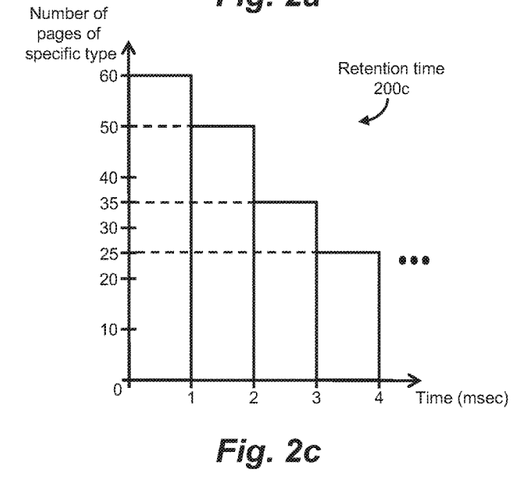
Figure 2D:
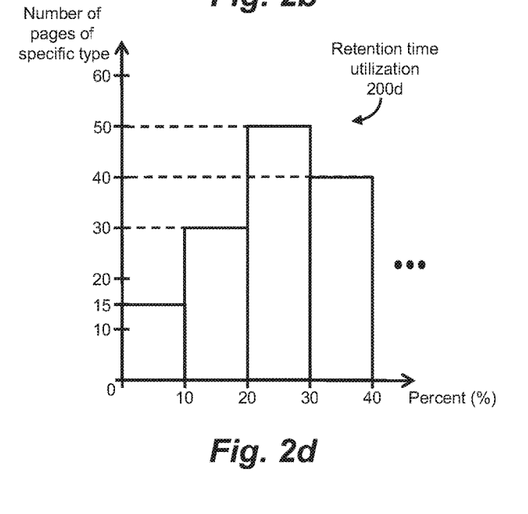

FIGS. 2a-2d illustrate exemplary histograms 200a-200d depicting data indicative of the "hits per retention time" metric (reference numeral 200a; see FIG. 2a), the "hit interval" metric (reference numeral 200b; see FIG. 2b), the "retention time" metric (reference numeral 200c; see FIG. 2c), and the "retention time utilization" metric (reference numeral 200d; see FIG. 2d). As shown in FIG. 2a, the histogram 200a for the "hits per retention time" metric depicts an exemplary number of pages of a specific type for each of multiple ranges of cache hits. Specifically, for a number of cache hits ranging from "0" to "100," the histogram 200a indicates "30" pages of the specific type; for a number of cache hits ranging from "100" to "1000," the histogram 200a indicates "50" pages of the specific type; for a number of cache hits ranging from "1000" to "10000," the histogram 200a indicates "55" pages of the specific type; and for a number of cache hits ranging from "10000" to "100000," the histogram 200a indicates "40" pages of the specific type. As shown in FIG. 2b, the histogram 200b for the "hit interval" metric depicts an exemplary number of pages of a specific type for each of multiple ranges of time intervals in microseconds (μsec). Specifically, for a time interval ranging from "0" to "100" μsec, the histogram 200b indicates "20" pages of the specific type; for a time interval ranging from "100" to "200" μsec, the histogram 200b indicates "30" pages of the specific type; for a time interval ranging from "200" to "300" μsec, the histogram 200b indicates "45" pages of the specific type; and for a time interval ranging from "300" to "400" μsec, the histogram 200b indicates "40" pages of the specific type. It is noted that the histograms 200a and 200b of FIGS. 2a and 2b, respectively, are described herein for purposes of illustration only and are not meant as limitations.

As shown in FIG. 2c, the histogram 200c for the "retention time" metric depicts an exemplary number of pages of a specific type for each of multiple ranges of time intervals in milliseconds (msec). Specifically, for a time interval ranging from "0" to "1" msec, the histogram 200c indicates "60" pages of the specific type; for a time interval ranging from "1" to "2" msec, the histogram 200c indicates "50" pages of the specific type; for a time interval ranging from "2" to "3" msec, the histogram 200c indicates "35" pages of the specific type; and for a time interval ranging from "3" to "4" msec, the histogram 200c indicates "25" pages of the specific type. As shown in FIG. 2d, the histogram 200d for the "retention time utilization" metric depicts an exemplary number of pages of a specific type for each of multiple ranges of percentages. Specifically, for a percentage ranging from "0" to "10" percent (%), the histogram 200d indicates "15" pages of the specific type; for a percentage ranging from "10" to "20" percent (%), the histogram 200d indicates "30" pages of the specific type; for a percentage ranging from "20" to "30" percent (%), the histogram 200d indicates "50" pages of the specific type; and for a percentage ranging from "30" to "40" percent (%), the histogram 200d indicates "40" pages of the specific type. It is noted that the histograms 200c and 200d of FIGS. 2c and 2d, respectively, are also described herein for purposes of illustration only and are not meant as limitations.

Further, in some embodiments, some of the plurality of metrics for each specific type of page can be collected using one or more counters 134, such as a counter 134.1 (see FIG. 1d) for tracking a "number of pages stored in cache" metric that indicates a current number of pages of the specific type in the cache 116, a counter 134.2 (see FIG. 1d) for tracking a "total request count" metric that indicates a total number of cache hits and cache misses for each page of the specific type, a counter 134.3 (see FIG. 1d) for tracking a "hit count" metric that indicates a current number of cache hits for each page of the specific type, and a counter 134.4 (see FIG. 1d) for tracking a "number of pages removed from cache" metric that indicates a current number of pages of the specific type evicted or removed from the cache 116. Based on the cache efficiency (or inefficiency), as determined by the plurality of metrics and/or the metrics instrumentation data, a size of the cache 116 can be reduced, the size of the cache 116 can be increased, or a specific type of page can be evicted or removed from the cache 116, thereby improving performance of the cache 116 or providing more optimal use of memory resources of the storage system 104.

In the context of the processing circuitry 110 being configured to execute specialized code and data (e.g., program instructions) out of the memory 112, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

During operation, the disclosed techniques can be used to analyze cache efficiencies in storage systems based on in-depth metrics instrumentation. In the disclosed techniques, data from the metrics instrumentation 124 (e.g., "enter" timestamp, "last hit" timestamp, hit count, type) can be collected for each storage element (e.g., page) of a specific type stored in the cache 116 of the storage system 104. Such data from the metrics instrumentation 124 for each page of a specific type can be initialized, updated, and/or incremented upon occurrences of certain cache events. For example, when a page of a specific type is stored in the cache 116, the "enter" timestamp 128.1 for the page may be initialized to the current time, the "last hit" timestamp 128.2 for the page may be initialized to "invalid," the "hit count" counter 130.1 for the page may be initialized to "0," and the type of the page may be initialized to its specific type (e.g., "data," "VLB," "hierarchical mapper," "space accounting," "page bin"). Further, when a page specified by a read request is hit in the cache 116, the "last hit" timestamp 128.2 for the page may be updated to the time of the read request, and the "hit count" counter 130.1 for the page may be incremented.

In addition, in the disclosed techniques, a plurality of metrics for the specific type of page (e.g., hits per retention time, hit interval, retention time, retention time utilization) can be generated based on at least some of the data from the metrics instrumentation 124 for pages of the specific type.

Such a plurality of metrics for a specific type of page can be updated, incremented, or decremented upon occurrences of certain cache events. For example, when a page of a specific type is evicted from the cache 116, (i) the "hits per retention time" histogram 132.1 for the specific type of page may be updated to include a hit count of the page, (ii) the "retention time" histogram 132.3 for the specific type of page may be updated to include the page's lifetime in the cache 116, which may be calculated as the current time minus the time indicated by the "enter" timestamp 128.1 for the page, (iii) the "number of pages stored in cache" counter 134.1 for the specific type of page may be decremented, (iv) the "retention time utilization" histogram 132.4 for the specific type of page may be updated to include a retention time utilization of the page, which may be calculated as the current time minus the time indicated by the "last hit" timestamp 128.2 for the page divided by the current time minus the time indicated by the "enter" timestamp 128.1 for the page, and (v) the "number of pages removed from cache" counter 134.4 for the specific type of page may be incremented.

Further, when a cache hit occurs for a page of a specific type, (i) the "hit interval" histogram 132.2 for the specific type of page may be updated to include the time interval since the last cache hit for the page, which may be calculated as the current time minus the time indicated by the "enter" timestamp 128.1 for the page, and (ii) the "hit count" counter 134.3 for the specific type of page may be incremented. Still further, when a page of a specific type is stored in the cache 116, the "number of pages stored in cache" counter 134.1 for the specific type of page may be incremented; and when a read request is issued specifying a page of a specific type, the "total request count" counter 134.2 for the specific type of page may be incremented. In some embodiments, the plurality of metrics for each specific type of page can be updated (and any corresponding counters can be reset) at predefined time intervals ranging from 1 to 30 seconds (secs) or any other suitable time intervals. In some embodiments, the plurality of metrics for each specific type of page can be obtained on field storage clusters to enable field analysis of storage appliances. Based on the cache efficiency (or inefficiency), as determined by the plurality of metrics and/or the metrics instrumentation data, a size of the cache 116 may be reduced, the size of the cache 116 may be increased, or a specific type of page may be evicted or removed from the cache 116, thereby improving performance of the cache 116 or providing more optimal use of memory resources of the storage system 104.

The disclosed techniques for analyzing cache efficiencies in storage systems based on in-depth metrics instrumentation will be further understood with reference to the following illustrative examples and FIGS. 1, 3a, 3b, 4a, 4b, 5a, and 5b. In a first example, the storage system 104 (see FIG. 1) collects, during runtime, metrics instrumentation data for each storage element (e.g., page) of a specific type stored in the cache 116. Further, based on at least some of the metrics instrumentation data, a "hits per retention time" metric and a "number of pages stored in cache" metric are generated for the specific type of page.

Figure 3A:
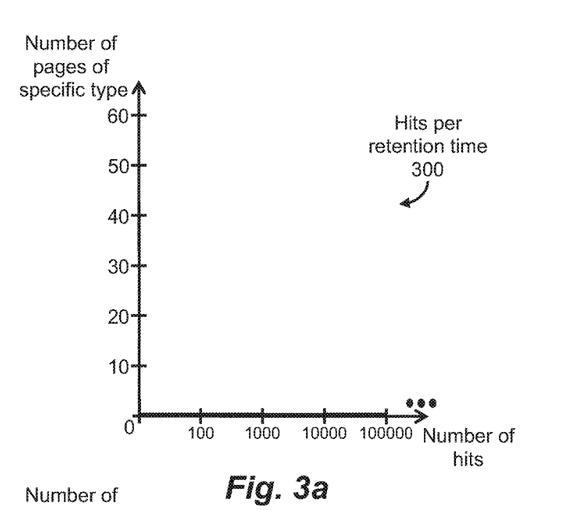
Figure 3B:
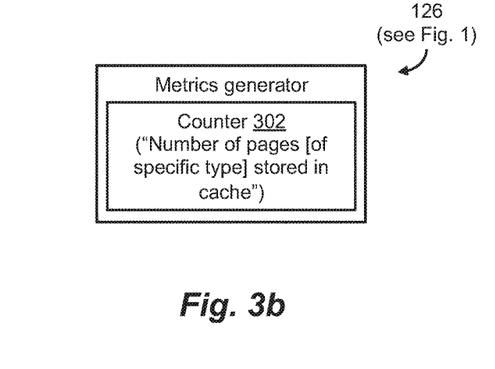

FIG. 3a illustrates a histogram 300 depicting data indicative of the "hits per retention time" metric generated in this first example. As shown in FIG. 3a, the histogram 300 for the "hits per retention time" metric depicts an exemplary number of pages of the specific type for each of multiple ranges of cache hits. Specifically, for a number of cache hits ranging from "0" to "100," the histogram 300 indicates about "0" pages of the specific type, and for a number of cache hits ranging from "100" to "1000," the histogram 300 also indicates about "0" pages of the specific type. Likewise, for a number of cache hits ranging from "1000" to "10000," the histogram 300 indicates about "0" pages of the specific type, and for a number of cache hits ranging from "10000" to "100000," the histogram 300 also indicates about "0" pages of the specific type. FIG. 3b depicts the metrics generator 126, which includes a counter 302 for tracking the "number of pages stored in cache" metric. In this first example, the "number of pages stored in cache" metric tracked by the counter 302 is assumed to be greater than zero (0). As described herein, the metrics generator 126 is configured to generate a plurality of metrics for each specific type of page stored in the cache 116 (e.g., the "hits per retention time" metric, the "number of pages stored in cache" metric) based on at least some of the data derived from the metrics instrumentation 124 for pages of the specific type.

In this first example, the processing circuitry 110 executes the cache efficiency code and data 122 to analyze the efficiency of the cache 116 and, having analyzed the efficiency, detects an inefficiency due to the number of pages of the specific type stored in the cache 116 being greater than "0" and the number of cache hits per retention time for pages of the specific type being about "0." Based on the detected inefficiency, a user of the storage system 104 may take remedial action(s) to improve performance of the cache 116, such as evicting or removing the specific type of page from the cache 116.

In a second example, the storage system 104 collects, during runtime, metrics instrumentation data for each storage element (e.g., page) of a specific type stored in the cache 116, including a "last hit" timestamp for a particular page of the specific type. Further, based on at least some of the metrics instrumentation data, a "retention time" metric is generated for the specific type of page.

Figure 4A:
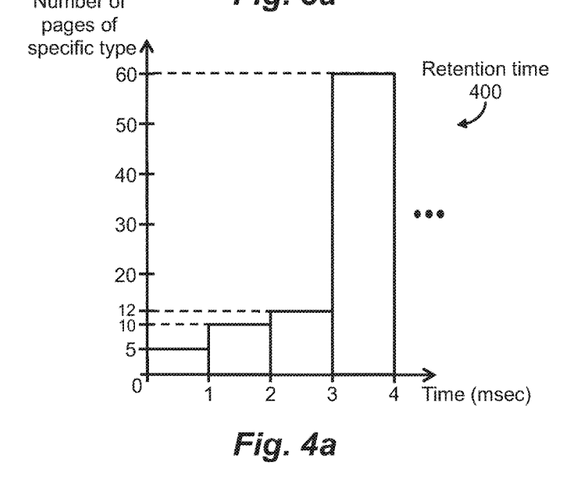
FIG. 4a is an exemplary histogram depicting data indicative of the "retention time" metric of FIG. 2c.
Figure 4B:
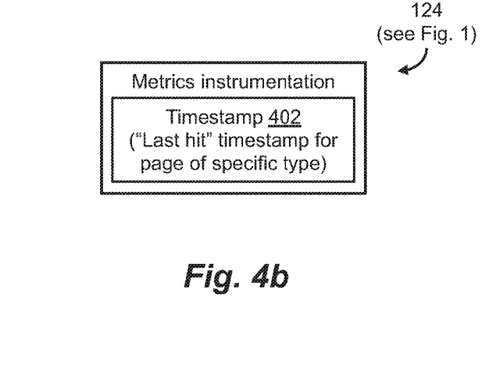
FIG. 4b is a block diagram of the metrics instrumentation of FIG. 1c including an exemplary "last hit" timestamp of a page of a specific type stored in a cache, for use in describing a second illustrative example of analyzing cache efficiencies based on in-depth metrics instrumentation.

FIG. 4a illustrates a histogram 400 depicting data indicative of the "retention time" metric generated in this second example. As shown in FIG. 4a, the histogram 400 for the "retention time" metric depicts an exemplary number of pages of the specific type for each of multiple ranges of time intervals in milliseconds (msec). Specifically, for a time interval ranging from "0" to "1" msec, the histogram 400 indicates "5" pages of the specific type, and for a time interval ranging from "1" to "2" msec, the histogram 400 indicates "10" pages of the specific type. Further, for a time interval ranging from "2" to "3" msec, the histogram 400 indicates "12" pages of the specific type, and for a retention time ranging from "3" to "4" msec, the histogram 400 indicates "60" pages of the specific type. FIG. 4b depicts the metrics instrumentation 124, which includes a timestamp 402 corresponding to the "last hit" timestamp for the particular page of the specific type. In this second example, the retention time (as illustrated by the histogram 400; see FIG. 4a) for most pages of the specific type is assumed to be much greater than the length of time since the last cache hit for the particular page of the specific type (as indicated by the timestamp 402; see FIG. 4b). As in the first example, the metrics generator 126 is configured to generate a plurality of metrics for each specific type of page stored in the cache 116 (e.g., the "retention time" metric) based on at least some of the data derived from the metrics instrumentation 124 for pages of the specific type.

In this second example, the processing circuitry 110 executes the cache efficiency code and data 122 to analyze the efficiency of the cache 116 and, having analyzed the efficiency, detects an inefficiency due to the retention time for most pages of the specific type being much greater than the length of time since the last cache hit for the particular page of the specific type. In such a scenario, it is likely that cache hits for the particular page of the specific type occurred during a limited time period, after which the particular page remained in the cache 116 with no additional cache hits. Based on the detected inefficiency, the user of the storage system 104 may take remedial action(s) to provide more optimal use of its memory resources, such as reducing the size of the cache 116.

In a third example, the storage system 104 collects, during runtime, metrics instrumentation data for each storage element (e.g., page) of a specific type stored in the cache 116, including a "last hit" timestamp and a hit count for a particular page of the specific type. Further, based on at least some of the metrics instrumentation data, a "retention time" metric is generated for the specific type of page.

Figure 5A:
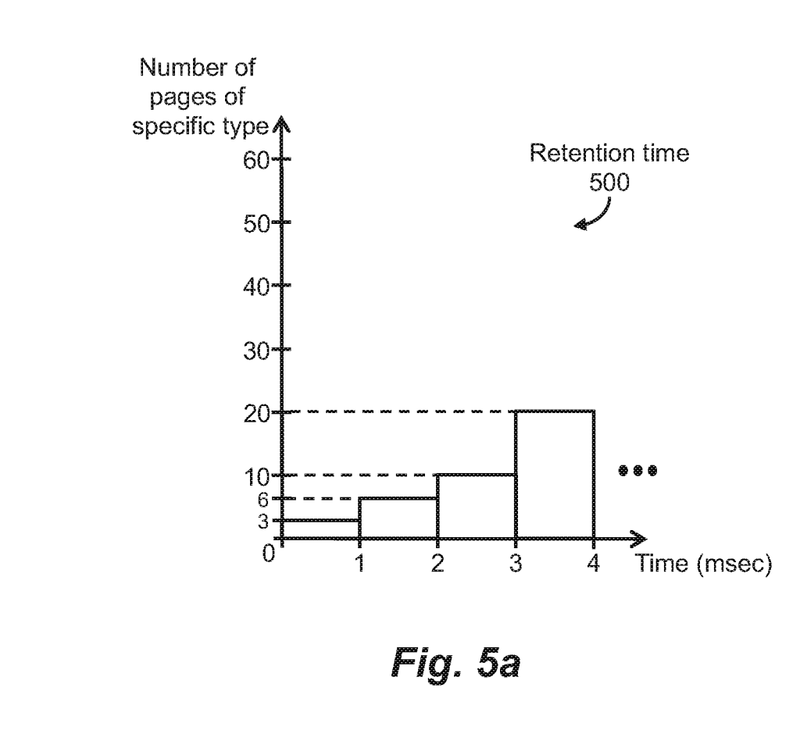
FIG. 5a is an exemplary histogram depicting data indicative of the "retention time" metric of FIG. 2c.
Figure 5B:
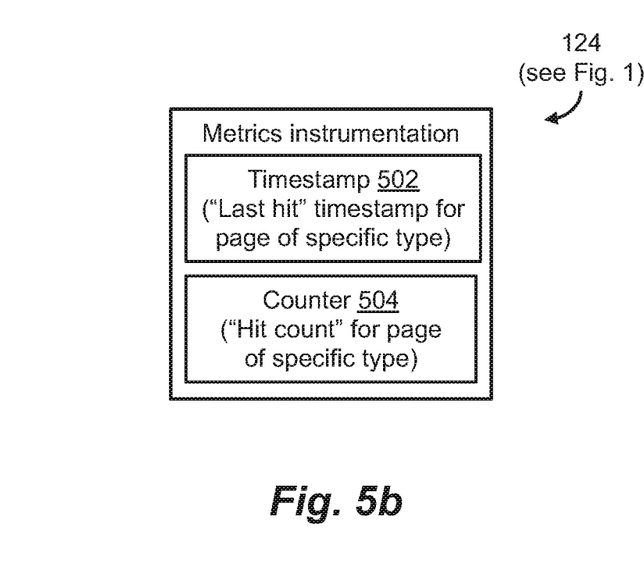
FIG. 5b is a block diagram of the metrics instrumentation of FIG. 1c including an exemplary "last hit" timestamp of a page of a specific type stored in a cache and an exemplary "hit count" counter for counting a current number of cache hits for the page of the specific type stored in the cache, for use in describing a third illustrative example of analyzing cache efficiencies based on in-depth metrics instrumentation.

FIG. 5a illustrates a histogram 500 depicting data indicative of the "retention time" metric generated in this third example. As shown in FIG. 5a, the histogram 500 for the "retention time" metric depicts an exemplary number of pages of the specific type for each of multiple ranges of time intervals in milliseconds (msec). Specifically, for a time interval ranging from "0" to "1" msec, the histogram 500 indicates "3" pages of the specific type, and for a time interval ranging from "1" to "2" msec, the histogram 500 indicates "6" pages of the specific type. Further, for a time interval ranging from "2" to "3" msec, the histogram 500 indicates "10" pages of the specific type, and for a time interval ranging from "3" to "4" msec, the histogram 500 indicates "20" pages of the specific type. FIG. 5b depicts the metrics instrumentation 124, which includes a timestamp 502 corresponding to the "last hit" timestamp for the particular page of the specific type, as well as a counter 504 for tracking the hit count for the particular page of the specific type. In this third example, the time interval since the last cache hit for the particular page of the specific type (i.e., the hit interval) is determined relative to the time indicated by the timestamp 502. As in the first and second examples, the metrics generator 126 generates a plurality of metrics for the specific type of page stored in the cache 116 (e.g., the "retention time" metric) based on at least some of the data from the metrics instrumentation 124 for pages of the specific type.

In this third example, the processing circuitry 110 executes the cache efficiency code and data 122 to analyze the efficiency of the cache 116, including obtaining the product of the hit interval and the hit count for the particular page of the specific type. Having analyzed the efficiency, the processing circuitry 110 detects an inefficiency due to the time specified by the product of the hit interval and the hit count for the particular page of the specific type being close to the retention time for the specific type of page. In such a scenario, it is likely that pages of the specific type are being evicted or removed from the cache 116 during time periods when cache hits are occurring for those pages. Based on the detected inefficiency, the user of the storage system 104 may take remedial action(s) to improve performance of the cache 116, such as increasing the size of the cache 116.

Figure 6:
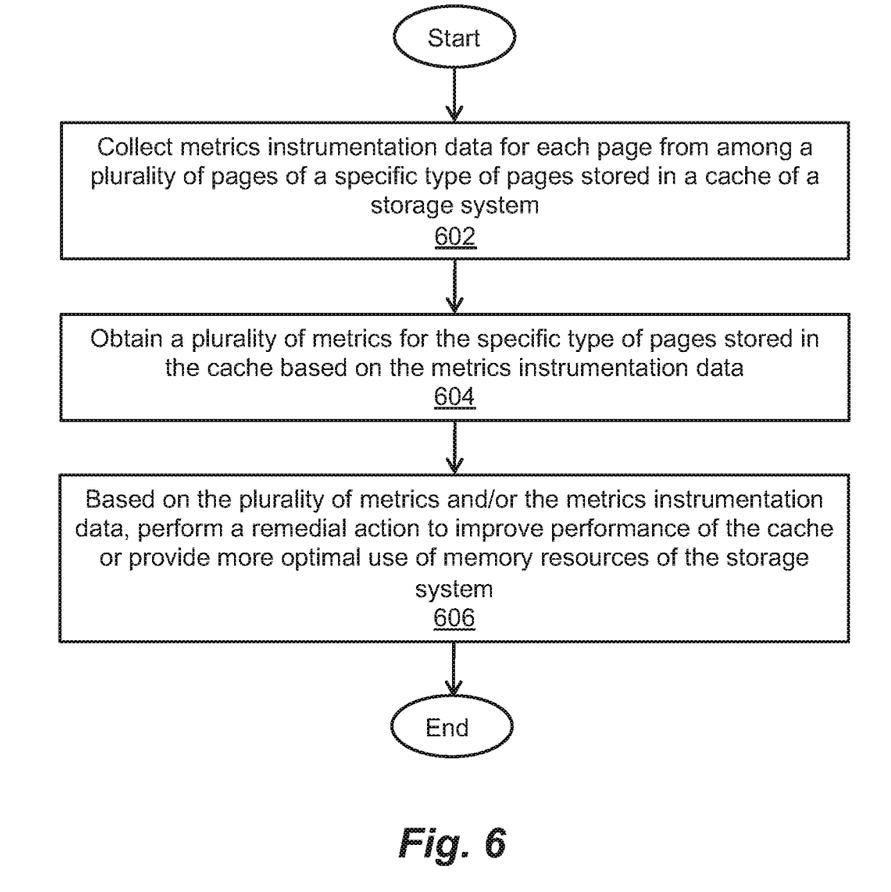
FIG. 6 is a flow diagram of an exemplary method of analyzing cache efficiencies in a storage system based on in-depth metrics instrumentation.

A method of analyzing cache efficiencies in storage systems based on in-depth metrics instrumentation is described below with reference to FIG. 6. As depicted in block 602, metrics instrumentation data is collected for each page from among a plurality of pages of a specific type of pages stored in a cache of a storage system. As depicted in block 604, a plurality of metrics are obtained for the specific type of pages stored in the cache based on the metrics instrumentation data. As depicted in block 606, based on the plurality of metrics and/or the metrics instrumentation data, a remedial action is performed to improve performance of the cache or provide more optimal use of memory resources of the storage system.

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data or take any other suitable action pertaining to operation of the storage system.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in some embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of analyzing cache efficiencies in a storage system, comprising:
storing a plurality of pages in a cache of a storage system;
collecting metrics instrumentation data for each page from among the plurality of pages stored in the cache;
determining a specific type of the page from the metrics instrumentation data, the specific type being one of a data type and a metadata type;
generating a plurality of metrics based on the specific type of the page stored in the cache; and
based on the plurality of metrics for the specific type of the page, performing an automated remedial action to improve performance of the cache or provide more optimal use of memory resources of the storage system,
wherein the method is performed by processing circuitry coupled to a memory.

2. The method of claim 1 wherein the metrics instrumentation data for each page of the specific type includes two or more of (i) a timestamp indicating when the page of the specific type was stored in the cache, (ii) a timestamp indicating when a last cache hit occurred for the page of the specific type, and (iii) a current number of cache hits for the page of the specific type.

3. The method of claim 1 wherein the plurality of metrics for the specific type of the page include two or more of (i) a total number of cache hits for each page of the specific type during a lifetime of the page in the cache, (ii) a time interval between cache hits for each page of the specific type, (iii) a lifetime of each page of the specific type in the cache, (iv) a current number of pages of the specific type stored in the cache, (v) a total number of cache hits and cache misses for each page of the specific type, (vi) a current number of cache hits for each page of the specific type, (vii) a time period during which cache hits occurred for each page of the specific type divided by the lifetime of the page in the cache, and (viii) a current number of pages of the specific type evicted from the cache.

4. The method of claim 1 wherein each page from among the plurality of pages is a metadata page, and wherein the specific type of pages is one of a VLB (virtual large block) type of metadata page, a hierarchical (top/mid/leaf) mapper type of metadata page, a space accounting type of metadata page, and a page bin type of metadata page.

5. The method of claim 1 wherein the performing of the remedial action includes reducing a size of the cache, increasing the size of the cache, or evicting one or more pages of the specific type from the cache.

6. The method of claim 1 wherein the plurality of metrics include (i) a total number of cache hits for each page of the specific type during a lifetime of the page in the cache, and (ii) a current number of pages of the specific type stored in the cache, and wherein the obtaining of the plurality of metrics includes generating a histogram depicting data indicative of the total number of cache hits for each page of the specific type during the lifetime of the page in the cache, and tracking, by a counter, the current number of pages of the specific type stored in the cache.

7. The method of claim 6 further comprising:
analyzing the histogram to determine that the total number of cache hits is approximately zero for each page of the specific type during the lifetime of the page in the cache; and
detecting an inefficiency of the cache due to the current number of pages of the specific type stored in the cache being greater than zero and the total number of cache hits being approximately zero for each page of the specific type during the lifetime of the page in the cache,
wherein the performing of the remedial action includes evicting one or more pages of the specific type from the cache.

8. The method of claim 1 wherein the metrics instrumentation data includes a timestamp indicating when a last cache hit occurred for a particular page of the specific type, wherein the plurality of metrics include a lifetime of each page of the specific type in the cache, and wherein the obtaining of the plurality of metrics includes generating a histogram depicting data indicative of the lifetime of each page of the specific type in the cache.

9. The method of claim 8 further comprising:
analyzing the histogram to determine the lifetime of each page of the specific type in the cache; and
detecting an inefficiency of the cache due to lifetimes of most pages of the specific type in the cache being significantly greater, above a predefined threshold, than a length of time since the last cache hit occurred for the particular page of the specific type,
wherein the performing of the remedial action includes reducing a size of the cache.

10. The method of claim 1 wherein the metrics instrumentation data includes a timestamp indicating when a last cache hit occurred for a particular page of the specific type, and a current number of cache hits for the particular page of the specific type, wherein the plurality of metrics include a lifetime of each page of the specific type in the cache, and wherein the obtaining of the plurality of metrics includes generating a histogram depicting data indicative of the lifetime of each page of the specific type in the cache, and tracking, by a counter, the current number of cache hits for the particular page of the specific type.

11. The method of claim 10 further comprising:
determining an interval of time since the last cache hit occurred for the particular page of the specific type relative to a time indicated by the timestamp; and
obtaining a product of the interval of time and the current number of cache hits for the particular page of the specific type.

12. The method of claim 11 further comprising:
analyzing the histogram to determine the lifetime of each page of the specific type in the cache; and
detecting an inefficiency of the cache due to the product of the interval of time since the last cache hit occurred for the particular page of the specific type and the current number of cache hits for the particular page of the specific type being approximately equal to a lifetime of the particular page in the cache,
wherein the performing of the remedial action includes increasing a size of the cache.

13. A system for analyzing cache efficiencies in a storage system, comprising:
a memory; and
processing circuitry configured to execute program instructions out of the memory to:
store a plurality of pages in a cache of a storage system;
collect metrics instrumentation data for each page from among the plurality of pages stored in the cache;
determine a specific type of the page from the metrics instrumentation data, the specific type being one of a data type and a metadata type;
generate a plurality of metrics based on the specific type of the page stored in the cache; and
based on the plurality of metrics for the specific type of the page, perform an automated remedial action to improve performance of the cache or provide more optimal use of memory resources of the storage system.

14. The system of claim 13 wherein the metrics instrumentation data for each page of the specific type includes two or more of (i) a timestamp indicating when the page of the specific type was stored in the cache, (ii) a timestamp indicating when a last cache hit occurred for the page of the specific type, and (iii) a current number of cache hits for the page of the specific type.

15. The system of claim 13 wherein the plurality of metrics for the specific type of the page include two or more of (i) a total number of cache hits for each page of the specific type during a lifetime of the page in the cache, (ii) a time interval between cache hits for each page of the specific type, (iii) a lifetime of each page of the specific type in the cache, (iv) a current number of pages of the specific type stored in the cache, (v) a total number of cache hits and cache misses for each page of the specific type, (vi) a current number of cache hits for each page of the specific type, (vii) a time period during which cache hits occurred for each page of the specific type divided by the lifetime of the page in the cache, and (viii) a current number of pages of the specific type evicted from the cache.

16. The system of claim 13 wherein the processing circuitry is further configured to execute the program instructions out of the memory to perform the remedial action of reducing a size of the cache, increasing the size of the cache, or evicting one or more pages of the specific type from the cache.

17. The system of claim 13 wherein each page from among the plurality of pages is a metadata page, and wherein the specific type of pages is one of a VLB (virtual large block) type of metadata page, a hierarchical (top/mid/leaf) mapper type of metadata page, a space accounting type of metadata page, and a page bin type of metadata page.

18. A computer program product including a set of non-transitory, computer-readable media having instructions that, when executed by processing circuitry, cause the processing circuitry to perform a method comprising:
storing a plurality of pages in a cache of a storage system;
collecting metrics instrumentation data for each page from among the plurality of pages stored in the cache;
determining a specific type of the page from the metrics instrumentation data, the specific type being one of a data type and a metadata type;
generating a plurality of metrics based on the specific type of the page stored in the cache; and
based on the plurality of metrics for the specific type of the page, performing an automated remedial action to improve performance of the cache or provide more optimal use of memory resources of the storage system, wherein the method is performed by processing circuitry coupled to a memory.

19. The computer program product of claim 18 wherein the metrics instrumentation data for each page of the specific type includes two or more of (i) a timestamp indicating when the page of the specific type was stored in the cache, (ii) a timestamp indicating when a last cache hit occurred for the page of the specific type, and (iii) a current number of cache hits for the page of the specific type.

20. The computer program product of claim 18 wherein the plurality of metrics for the specific type of the page include two or more of (i) a total number of cache hits for each page of the specific type during a lifetime of the page in the cache, (ii) a time interval between cache hits for each page of the specific type, (iii) a lifetime of each page of the specific type in the cache, (iv) a current number of pages of the specific type stored in the cache, (v) a total number of cache hits and cache misses for each page of the specific type, (vi) a current number of cache hits for each page of the specific type, (vii) a time period during which cache hits occurred for each page of the specific type divided by the lifetime of the page in the cache, and (viii) a current number of pages of the specific type evicted from the cache.

* * * * *